W. I. OESCHGER.
INDICATOR.
APPLICATION FILED AUG. 7, 1915.
1,205,105.
Patented Nov. 14, 1916.
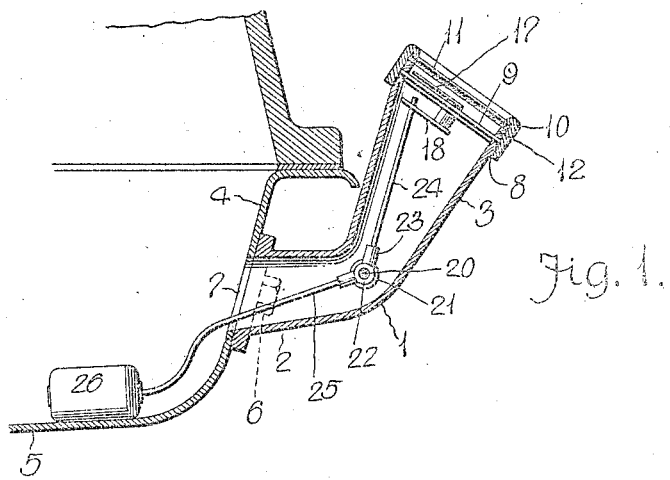
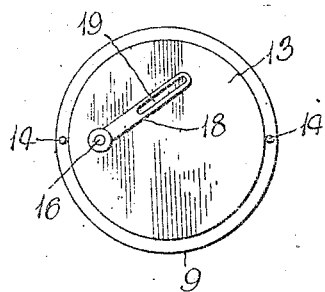
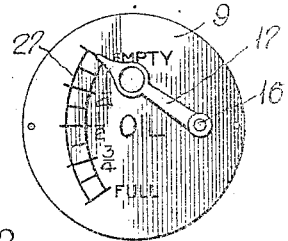
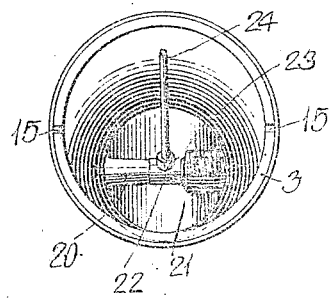
Witnesses
Chas. W. Stauffiger
Karl N. Butler
Inventor
Walter I. Oeschger,
By
Attorneys

UNITED STATES PATENT OFFICE.

WALTER I. OESCHGER, OF DETROIT, MICHIGAN, ASSIGNOR TO RETLAW MANUFACTURING COMPANY, OF DETROIT, MICHIGAN, A CORPORATION OF MICHIGAN.

INDICATOR.

1,205,105.     Specification of Letters Patent.     Patented Nov. 14, 1916.

Application filed August 7, 1915.   Serial No. 44,347.

*To all whom it may concern:*

Be it known that I, WALTER I. OESCHGER, a citizen of the United States of America, residing at Detroit, in the county of Wayne and State of Michigan, have invented certain new and useful Improvements in Indicators, of which the following is a specification, reference being had therein to the accompanying drawings.

In the operation of multi-cylinder internal combustion engines, particularly those of automobiles, it is the present practice to maintain oil in the crank case of the engine, to lubricate crank pins, bearings and other movable parts by splash or automatic feed systems, and this invention relates to means for determining the quantity or level of oil in an engine crank case.

The object of my invention is to provide an indicator of the float actuated type which can be easily and quickly installed to indicate the quantity of lubricant in a crank case, the indicator being simple in construction, not liable to injury by ordinary use, and highly efficient for the purposes for which it is intended.

The above and other objects are attained by a mechanical construction that will be hereinafter specifically described and then claimed, and reference will now be had to the drawing, wherein—

Figure 1 is a longitudinal sectional view of the indicator as applied to a portion of the crank case; Fig. 2 is an end view of an angle connection constituting a housing for the indicator; Fig. 3 is a bottom plan of the indicator dial, and Fig. 4 is a top plan of the same.

In the drawing, 1 denotes, by the way of an example, a hollow angle connection having a flared inner end 2 and a flared outer end 3. The inner end 2 of the angle connection is suitably connected to the side wall 4 of an engine crank case 5, by screw bolts 6 or similar fastening means, and this inner end of the angle connection communicates or registers with an opening 7 in the wall 4.

The outer flared end 3 of the angle connection 1 is exteriorly screwthreaded, as at 8, and seated on the outer end of said connection is a dial plate 9 retained thereon by a cap 10, screwed upon the outer end 3 of the connection. The cap 10 has a transparent plate 11, preferably made of glass, whereby the dial plate 9 can be easily observed. The transparent plate 11 is retained within the cap 10 preferably by a packing ring 12 which also engages the dial plate 9, as shown in Fig. 1, and coöperates with the cap 10 in holding the dial plate upon its seat. The dial plate, as shown in Figs. 3 and 4, has a circular enlargement 13 fitting in the end of the connection and properly positioning the dial plate relative to said connection. The dial plate is prevented from rotating upon its seat by dowel pins 14 engaging in slots or notches 15 provided therefor in the end of the connection. It is therefore possible to correctly position the dial plate prior to placing the cap 10 upon the connection.

Journaled in the dial plate 9, contiguous to an edge thereof, is a spindle 16 and mounted upon the outer end of said spindle is an indicator hand or pointer 17. Mounted upon the inner end of the spindle is a crank 18 provided with a longitudinal slot 19.

At the angle of the connection 1 is a transverse bearing pin or pivot shaft 20 supported by oppositely disposed bosses or bearings 21 and a portion of said shaft is preferably in the form of a screw whereby it can be mounted in one of the bosses or bearings. On the pivot shaft 20, between the bosses 21, is a barrel 22 having sockets 23 for arms 24 and 25. These arms are disposed as cranks and the arm 24 extends into the slot 19 of the crank 18. The arm 25 extends through the opening 7 of the crank case 5 and is bent upon a compound curve in proximity to the bottom of the crank case, the end of said arm having a buoyant body or float 26 made of a suitable material not susceptible to the action of oil in the crank case of the engine.

The outer face of the dial plate 9 is printed or otherwise marked, as shown in Fig. 4, to provide a segment scale 27 adapted to be traversed by the end of a hand or pointer 17. The scale is graduated and has such demarcations as "empty" and "full" and is furthermore marked to indicate certain stages of oil or lubricant in the crank case.

The crank case 5 can be filled through a suitable opening (not shown) or may be filled by removing the cap 10 and the dial plate 9. It is preferable however to provide a regular filling opening for the crank case 5, whereby it will be unnecessary to remove the dial plate 9. When the crank case is filled the float or buoyant body 26 is raised and through the medium of the arms 25, 24 and crank 18, the hand or pointer 17 is swung to the "full" designation. As the oil or lubricant is used the float or buoyant body descends and by observing the dial it is possible to determine the quantity of lubricant remaining in the crank case.

It is thought that the operation and utility of the indicator will be apparent without further description, and while in the drawing there is illustrated a preferred embodiment of my invention, it is to be understood that the structural elements are susceptible to such variations and modifications as fall within the scope of the appended claims.

What I claim is:—

1. An indicator of the type described comprising an angle connection adapted for attachment to an engine crank case, a detachable dial carried by said angle connection, a spindle disposed eccentrically of said dial, a pointer on the outer end of said spindle adapted to swing in an arc over said dial, a slotted crank on the inner end of said spindle and in parallelism with said dial, and a float actuated arm in said angle connection and pivoted in the angle of said connection with the outer end of said arm extending into the slotted portion of said crank whereby a movement of said float actuated arm imparts a rocking movement to said spindle.

2. An indicator comprising an angle connection adapted for attachment to an engine crank case, a detachable dial carried by the outer end of said angle connection, a cap on said connection having a transparent plate protecting said dial, a pointer movable in front of said dial, a slotted crank back of said dial in parallelism with said pointer, means connecting said pointer and said slotted crank whereby said pointer and crank can only move in synchronism, an arm in said angle connection engaging in the slot of said crank, and a float on said arm.

In testimony whereof I affix my signature in presence of two witnesses.

WALTER I. OESCHGER.

Witnesses:
 ANNA M. DORR,
 LEWIS E. FLANDERS.